(12) United States Patent
Nadathur et al.

(10) Patent No.: US 8,904,007 B2
(45) Date of Patent: Dec. 2, 2014

(54) CONNECTION DISTRIBUTION WITHIN A CONNECTIONAL PARALLELISM ARCHITECTURE

(75) Inventors: Gokul Nadathur, Fremont, CA (US); Anumita Biswas, Santa Clara, CA (US)

(73) Assignee: NetApp, Inc., Sunnyvale, CA (US)

(*) Notice: Subject to any disclaimer, the term of this patent is extended or adjusted under 35 U.S.C. 154(b) by 128 days.

(21) Appl. No.: 13/217,051

(22) Filed: Aug. 24, 2011

(65) Prior Publication Data
US 2014/0082175 A1    Mar. 20, 2014

(51) Int. Cl.
*G06F 15/173* (2006.01)
(52) U.S. Cl.
USPC .......................................... 709/226; 709/224
(58) Field of Classification Search
CPC ......................................................... G06F 15/16
USPC .................................................. 709/224, 226
See application file for complete search history.

(56) References Cited

U.S. PATENT DOCUMENTS

2003/0041146 A1* 2/2003 Davis et al. .................. 709/227
2010/0064286 A1* 3/2010 Pinter et al. .................. 718/102

* cited by examiner

*Primary Examiner* — David Lazaro
*Assistant Examiner* — Marie Georges Henry
(74) *Attorney, Agent, or Firm* — Mahamedi Paradice LLP

(57) ABSTRACT

Example embodiments provide various techniques for distributing connections within a connectional parallelism architecture. In one embodiment, a method is provided where resource utilizations of connection groups are measured. Here, each connection group is assigned to one of multiple processors. A probability distribution is accessed that maps probabilities assigned to relative resource utilizations. A relative resource utilization of one of the connection groups is determined based on a resource utilization of the one connection group relative to other resource utilizations of other connection groups. A probability from the probability distribution is identified based on the determined relative resource utilization, and based on the identified probability, a connection is assigned to this connection group for execution by one of the processors assigned to this connection group.

21 Claims, 9 Drawing Sheets

CONNECTION DISTRIBUTION WITHIN A CONNECTIONAL PARALLELISM ARCHITECTURE

FIELD

The present disclosure relates generally to network-based systems. In an exemplary embodiment, the disclosure relates to connection distribution within a connectional parallelism architecture.

BACKGROUND

As demand for network content increases, the need for greater network bandwidth to handle the demand also continues to increase. Currently, many network-based systems provide multiple processors that can process in parallel to handle the increasing demands for network bandwidth. For example, applications on network devices (such as computer systems connected over a network) can create connections among each other over which they can exchange streams of data in the form of data packets. A data packet is a unit of information transmitted as a discrete entity between devices over the network. To achieve high-speed and high-performance of data packet processing, it is common to parallelize the processing so that network devices can execute more than one thread (e.g., a separate stream of packet execution that takes place simultaneously with and independently from other processing) simultaneously on a multi-processing platform.

Multi-processing is useful when a single task takes a long time to complete and processing packets serially (e.g., one at a time) would slow down the overall packet throughput. In a multiprocessing system, packets can be queued to network groups (e.g., data structures that queue data packets that belong to the same network connection) for further processing based on some kind of algorithm. As a result, data packets that belong to a single connection (such as, for example, a Transmission Control Protocol (TCP) connection) are queued to a single network group, and thus are processed by a single network thread. Data packets that belong to different network connections may be processed by different network threads.

However, one problem associated with parallel processors is parallelism efficiency, or the performance improvement relative to the number of processors. The law of diminishing returns dictates that, as the number of processors increases, the gain in performance decreases. Therefore, keeping parallelism efficiency high has been a constant challenge in multiprocessor research.

A recent attempt to improve multiprocessor efficiency for network applications focuses on the framework of connectional parallelism. In connectional parallelism, implementations of connection-parallel stacks map operations to groups of connections and permit concurrent processing on independent connection groups, thus treating a group of connections as a unit of concurrency. In particular, each independent connection group is serviced on an independent kernel thread, and each kernel thread may be executed on any one of multiple processors.

Currently, connections are assigned to independent threads of execution either randomly or sequentially (e.g., round robin fashion). However, the sequential or random policy assignment may not efficiently utilize parallelism effectively or efficiently because network traffic is unpredictable and the resultant traffic load distribution across all available processors may be unpredictable and/or non-uniform.

SUMMARY

Exemplary embodiments of the present invention provide various techniques for distributing connections within a connectional parallelism architecture to different threads of execution where these threads of executions run on independent processing units. Instead of distributing the connections randomly or sequentially, the connections are distributed using a predefined probability distribution. In particular, this probability distribution is a mapping of relative resource utilizations to their respective probabilities for assignment of work to the same resource. In one embodiment, a resource utilization of a particular connection group is determined relative to the resource utilizations of other connection groups. This determined relative resource utilization can then be used to look up its corresponding probability from the predefined probability distribution. This probability is then used to determine whether a connection should be assigned to that particular connection group.

As a result of using this probability distribution for distributing connections, the connection distribution is therefore dynamic, meaning that it takes into account the resource utilizations of all connection groups. Such a distribution using a predefined probability distribution can be more efficient at distributing connections to underutilized processors when compared to conventional random and sequential distributions. As a result, the connection distribution described herein takes into account the unpredictability of network traffic to distribute the connections evenly.

BRIEF DESCRIPTION OF DRAWINGS

The present disclosure is illustrated by way of example and not limitation in the figures of the accompanying drawings, in which like references indicate similar elements and in which.

DESCRIPTION OF EXEMPLARY EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail. Furthermore, the term "exemplary" is construed merely to mean an example of something or an exemplar and not necessarily a preferred or ideal means of accomplishing a goal.

Figure 1A:
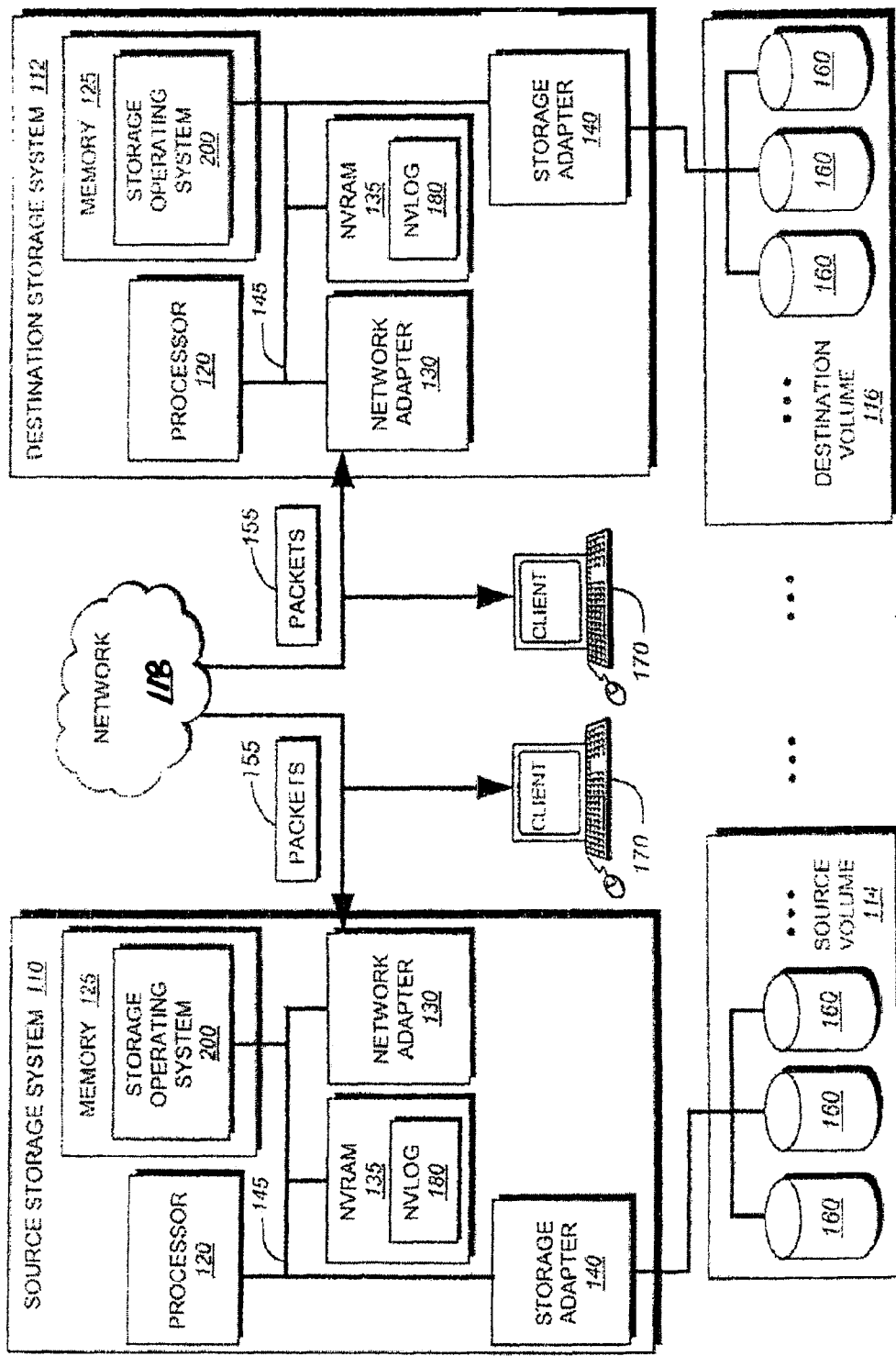
FIG. 1A is a schematic block diagram of storage system environment that includes a pair of interconnected network devices, such as a source network device and a destination network device.

FIG. 1A is a schematic block diagram of storage system environment that includes a pair of interconnected network devices, such as a source network device and a destination network device. The source network device can be a storage system, such as storage system 110 or a client device, such as client 170. The destination network device can be a destination storage system 112. For purposes of this description, the source storage system 110 is a device that manages storage of one or more source volumes 117, each having an array of storage devices 160 (described further below). The destination storage system 112 manages one or more destination volumes 116, which, in turn, comprise arrays of devices 160. The source and destination storage systems (e.g., systems 110 and 112) are connected via a network 118 that can comprise a local or wide area network. For the purposes of this description, like components in each of the source and destination storage system, 110 and 112, respectively, are described with like reference numerals. As used herein, the term "source" can be broadly defined as a location from which data travels and the term "destination" can be defined as the location to which the data travels. Both source storage system and destination storage system are multiprocessing systems.

To improve reliability and facilitate disaster recovery in the event of a failure of a storage system, its associated devices or some portion of the storage infrastructure, source storage system 110 and destination storage system 112 may execute a replication application configured to replicate some or all of the underlying data and/or the file system that organizes the data. Such an application that establishes and maintains mirror relationship between a source storage system and a destination system and provides infinite updates to the destination storage system can be SNAPMIRROR. Currently, when a component of a replication application executed at the source storage system 110 establishes a connection with a component of a replication application at the destination storage system 112 to transfer data packets over the network, the replication application at the destination storage system 112 has no control how data packets are going to be processed. Thus, packets that belong to the same session, but to different connections, might be processed by different network threads. Instead, these packets are being reassembled after being processed by different network threads. This, in turn, slows down the performance of the computer systems that processes the received packets.

The source and destination storage systems 110, 112 each comprise a plurality of processors 120, a memory 125, a network adapter 130 and a storage adapter 140 interconnected by a system bus 145. Each storage system 110, 112 also includes a storage operating system 200 that implements, for example, a file system to logically organize the information as a hierarchical structure of directories and files on devices.

In the illustrative embodiment, the memory 125 comprises storage locations that are addressable by the processors and adapters for storing software program code. The memory 125 can be a random access memory (RAM). The processor and adapters may, in turn, comprise processing elements and/or logic circuitry configured to execute the software code and manipulate the data structures stored in memory. The operating system 200 portions of which are typically resident in memory, functionally organizes the storage system by, inter alia, invoking storage operations in support of a file service implemented by the storage system. It will be apparent to those skilled in the art that other processing and memory means, including various computer readable media, may be used for storing and executing program instructions pertaining to the inventive technique described herein.

The network adapter 130 comprises the mechanical, electrical and signaling circuitry needed to connect each storage system 110, 112 to the network 118, which may comprise a point-to-point connection or a shared medium, such as a local area network.

The storage adapter 140 cooperates with the operating system 200 executing on the storage system to access information requested by the client (such as client 170). The information may be stored on the devices 160 that are attached, via the storage adapter 140 to each storage system 110, 112 or other node of a storage system as defined herein.

In one exemplary implementation, each storage system 110, 112 can include a nonvolatile random access memory (NVRAM) 135 that provides fault-tolerant backup of data, enabling the integrity of storage system transactions to survive a service interruption based upon a power failure, or other fault. The size of the NVRAM depends in part upon its implementation and function in the storage system. It is typically sized sufficiently to log a certain time-based chunk of transactions.

Figure 1B:
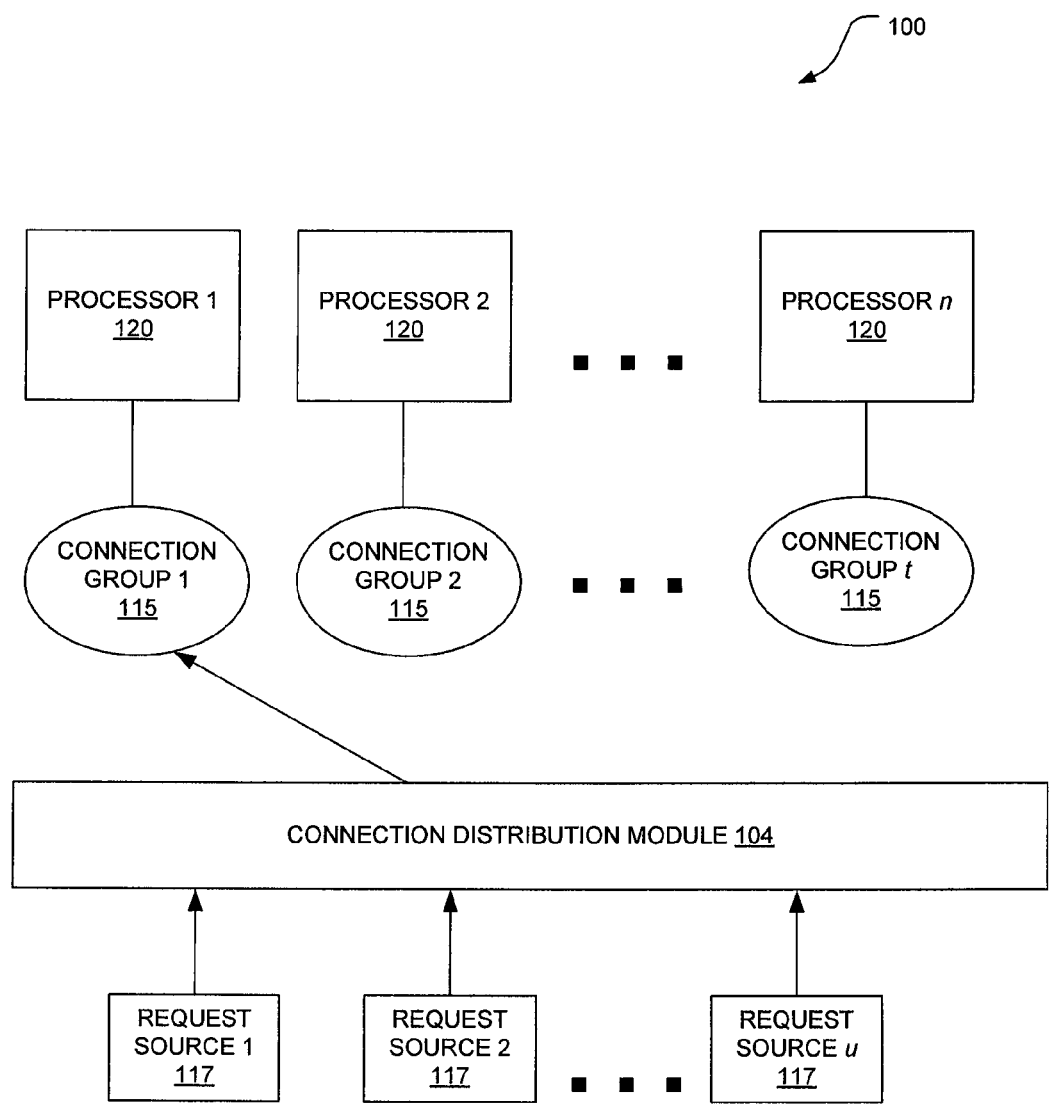
FIG. 1B is a block diagram depicting a topological view of a connectional parallelism architecture that may apply to the storage system environment depicted in FIG. 1A, in accordance with an embodiment of the present invention.

FIG. 1B is a block diagram depicting a topological view of a connectional parallelism architecture that may apply to the storage system environment depicted in FIG. 1A, in accordance with an embodiment of the present invention. In general, connectional parallelism is a data communication mode where devices at the end points use a protocol to establish an end-to-end logical or physical connection before any data may be sent. In connectional parallelism, messages are bound to processors 120. That is, messages coming from the same connection are assigned to the same processor. Examples of connections include Transmission Control Protocol (TCP) connection and Datagram Protocol (UDP).

As depicted in FIG. 1B, an exemplary system 100 having such a connectional parallelism architecture includes multiple processors 120 (processors 1, 2, . . . n), multiple connection groups 115 (connection groups 1, 2, . . . t), at least one connection distribution module 104, and multiple request sources 117 (request sources 1, 2, . . . u). Here, each processor 120 is a single processing or computing element that reads and executes program instructions. For example, each processor 120 can perform a task defined in a network protocol. Connectional parallelism architecture is scalable because if further performance is needed to process additional connections, more processors 120 (1, 2, . . . n) can be added to the system 100. In one embodiment, all the processors 120 can be embodied in a single processing system (e.g., a single file server or a single network interface card). In another embodiment, one or more of the processors 120 can be embodied in different processing systems (e.g., multiple file servers or multiple network interface cards).

Each connection group 115 represents the finest granule of parallelism in a connectional parallelism architecture. In particular, each independent connection group 115 is serviced on an independent kernel thread, and each kernel thread may be executed on any one of multiple processors 120. In a connectional parallelism architecture, implementations of connection-parallel stacks map operations to groups of connections and permit concurrent processing on independent connection groups 115, therefore treating a connection group 115 as a fundamental unit of concurrency. Accordingly, the processors 120 can simultaneously process messages as long as the messages belong to different connection groups 115. In a connectional parallelism architecture, a single connection therefore is assigned to a single processor 120. It should be noted that each connection group 115 may also be referred to as a "context" or as a "network context."

Each request source 117 is an element in the system 100 that can transmit requests to a processor 120. For instance, a Hypertext Transfer Protocol (HTTP) application that sends socket calls to the TCP/Internet Protocol (IP) stack constitutes a request source 117. Each request source 117 can send requests to any processor 120. In the system 100, the connection distribution module 104 basically decides which processor 120 is to handle each request. One function of the connection distribution module 104 is to queue messages belonging to the same connection group 115 to the same processor 120. As explained in detail below, the connection distribution module 104, in one embodiment, assigns each connection to a processor 120 based on a probability distribution.

Figure 2A:
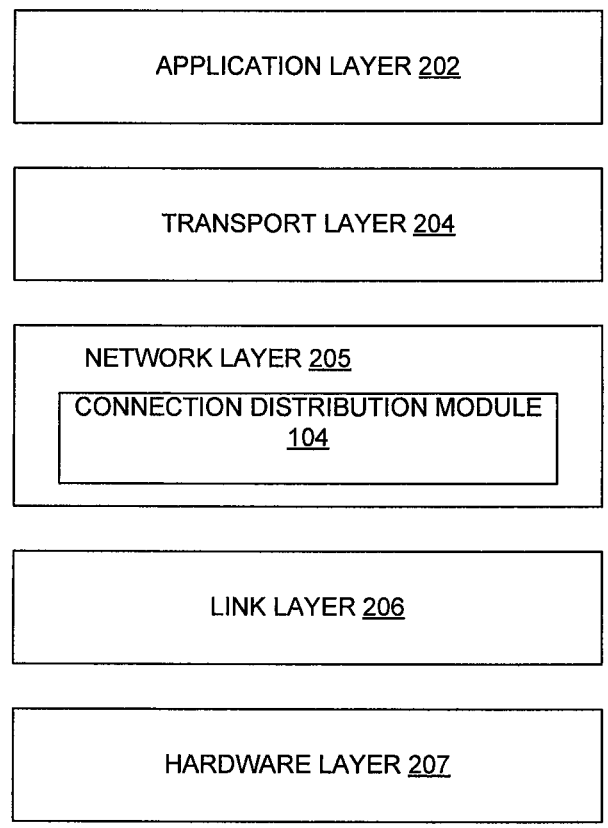
FIG. 2A is a block diagram of an example of an Open Systems Interconnection (OSI) architecture.

FIG. 2A is a block diagram of an example of an Open Systems Interconnection (OSI) architecture. At the bottom of the OSI stack is a hardware layer 207, which encompasses the physical devices that provide connectivity to the networks (e.g., Ethernet devices). Near the bottom of the OSI stack is a link layer 206, which encompasses device drivers that provide access to the hardware layer 207. Above the link layer 206 is a network layer 205, which is responsible for directing packets to their destinations. The next transport layer 204 is responsible for peer-to-peer communication. It should be appreciated that while the network layer 205 manages communication between hosts, the transport layer 204 manages communication between endpoints within those hosts. Finally, the application layer 202 contains all protocols and methods that fall into the realm of process-to-process communications across, for example, an Internet Protocol (IP) network. For example, the application layer 202 can include HTTP, which moves requests and responses for Web content between a server and a client.

In one embodiment, the connection distribution module 104 discussed earlier is embodied in the network layer 205. As explained in detail below, the connection distribution module 104 assigns each connection to a particular processor based on a probability distribution. It should be appreciated that in other embodiments, the network layer 205 may include fewer or more modules apart from those shown in FIG. 2A. The module 104 may be in the form of software that is processed by a processor. In another example, as explained in more detail below, the module 104 may be in the form of firmware that is processed by application-specific integrated circuits (ASIC), which may be integrated into a circuit board. Alternatively, the module 104 may be in the form of one or more logic blocks included in a programmable logic device (for example, a field programmable gate array). The described module 104 may be adapted, and/or additional structures may be provided, to provide alternative or additional functionalities beyond those specifically discussed in reference to FIG. 2A. Examples of such alternative or additional functionalities will be discussed in reference to the flow diagrams discussed below.

Figure 2B:
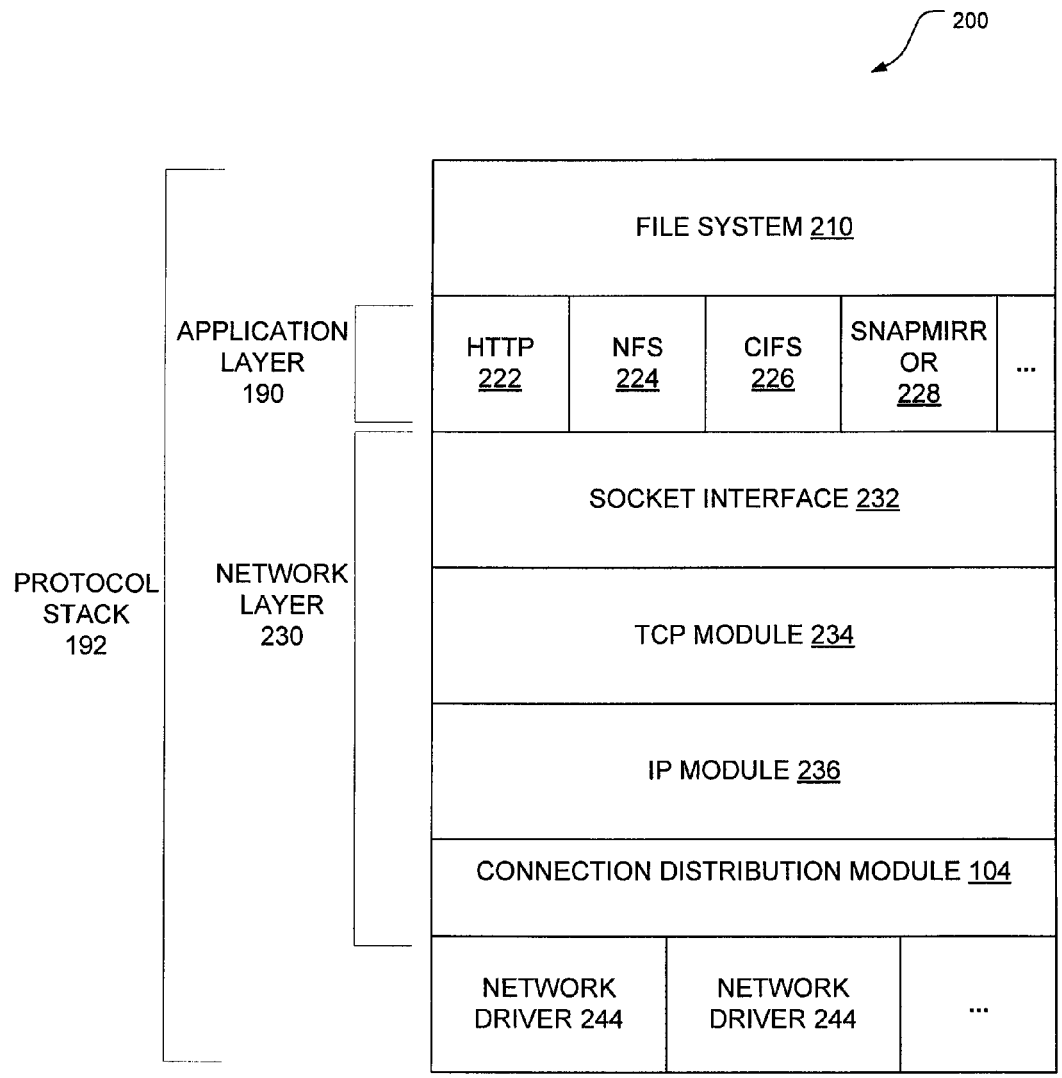
FIG. 2B is an architectural block diagram of components of a storage operating system of a storage system that may be used with embodiments of the present invention.

FIG. 2B is an architectural block diagram of components of a storage operating system 200 of a storage system that may be used with embodiments of the present invention. Although some of the components have been described in reference to FIG. 2A, these components will be described in greater detail herein. In the illustrative embodiment, the storage operating system 200 can be the NETAPP DATA ONTAP operating system that implements the file system 210. However, it is expressly contemplated that any appropriate file system or storage system may be enhanced for use in accordance with the inventive principles described herein. As used herein, the term "storage operating system" generally refers to the computer-executable code operable on a computer that that stores data and provides access to the data via one or more types of networks. The storage operating system 200 can be implemented as an application program operating over a general-purpose operating system, such as UNIX, or as a general-purpose operating system with configurable functionality, which is configured for storage applications as described herein. The storage operating system 200 further includes a storage device management module (not shown in FIG. 2) that manages access operations to storage devices. The storage device management module may include a module that implements a storage protocol and a driver layer that implements a disk access protocol (these layers are not shown in FIG. 2).

The storage operating system 200 comprises a series of layers (or modules) organized to form an integrated network protocol stack 192 or, more generally, a multi-protocol engine that provides data paths for clients or other storage systems to access information stored on the storage system using block and file access protocols. The protocol stack 192 includes an application layer 190 that may include a Common Internet File System (CIFS) server 226, an Network File System (NFS) server 224, a Hypertext Transfer Protocol (HTTP) server 222, SNAPMIRROR application 228, as well as other applications.

Additionally included in the integrated network protocol stack 192 is a network layer 230 that interfaces with network drivers 244 (e.g., gigabit Ethernet drivers). In one embodiment, the network layer 230 includes an IP module 236 and its supporting transport mechanisms (e.g., the TCP module 234), as well as a socket interface 232, such as Berkeley Software Distribution (BSD) interface. The network layer 230 further includes the connection distribution module 104 as described above.

Figure 3:
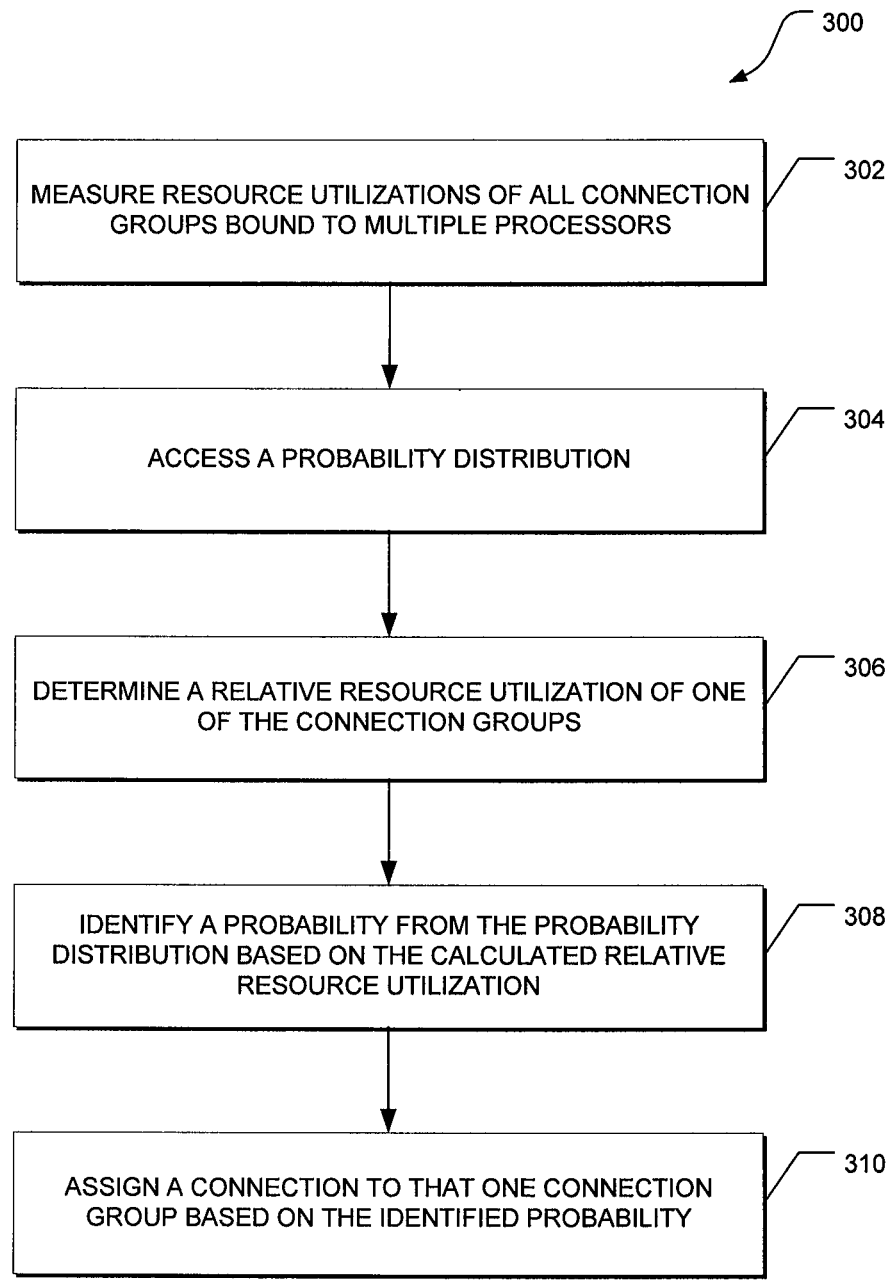
FIG. 3 is a flow diagram of a general overview of a method, in accordance with an embodiment, of distributing connections in a connectional parallelism architecture.

FIG. 3 is a flow diagram of a general overview of a method 300, in accordance with an embodiment, of distributing connections in a connectional parallelism architecture. In an exemplary embodiment, the method 300 may be implemented by the connection distribution module 104 as embodied in the network layer 205 depicted in FIG. 2A. In reference to FIG. 3, the connection distribution module at 302 initially measures resource utilizations of all connection groups. A "resource utilization," as used herein, refers to a measure of workload associated with a connection group. In one exemplary embodiment, the resource utilization is a data rate (e.g., average number of kilobytes per second) that is serviced by each connection group. In another exemplary embodiment, the resource utilization is a number of open connections to each connection group.

Additionally, at 304, the connection distribution module accesses a probability distribution and, with all resource utilizations measured, the connection distribution module determines at 306 a relative resource utilization of one of the connection groups. As used herein, a probability distribution is a distribution of probabilities as a function of relative resource utilizations. A relative resource utilization is a resource utilization of a particular connection group as defined in relation to the resource utilizations of other connection groups. In one embodiment, the relative utilization of a connection count-based distribution can be expressed as:

$$X(A) = \frac{M(A) * 100}{T} \qquad 1.0$$

The relative utilization X(A) expressed in Equation 1.0 is a fraction of a number of active connections owned by any one connection group to a total number of connections. "A" therefore refers to any connection group, "M(A)" is a number of active connections owned by connection group A, and "T" is a total number of connections. In another embodiment, the relative utilization of a frame rate-based distribution can also be expressed using Equation 1.0. This alternate relative utilization X(A) is a fraction of frames serviced by any one connection group to the total frames. Here, "A" refers to any connection group, "M(A)" is a data rate serviced by connection group A, and "T" is a total data rate serviced by all connection groups.

Still referring to FIG. 3, at 308, the connection distribution module thereafter identifies a probability from the accessed probability distribution based on the determined relative resource utilization. That is, the connection distribution module uses the determined relative resource utilization to look up its corresponding probability from the probability distribution. With the probability identified, the connection distribution module then assigns the connection to that one connection group at 310 based on the identified probability. As explained in detail below, in one embodiment, the connection distribution module can assign the connection based on a comparison of a random number with the identified probability.

Figure 4:
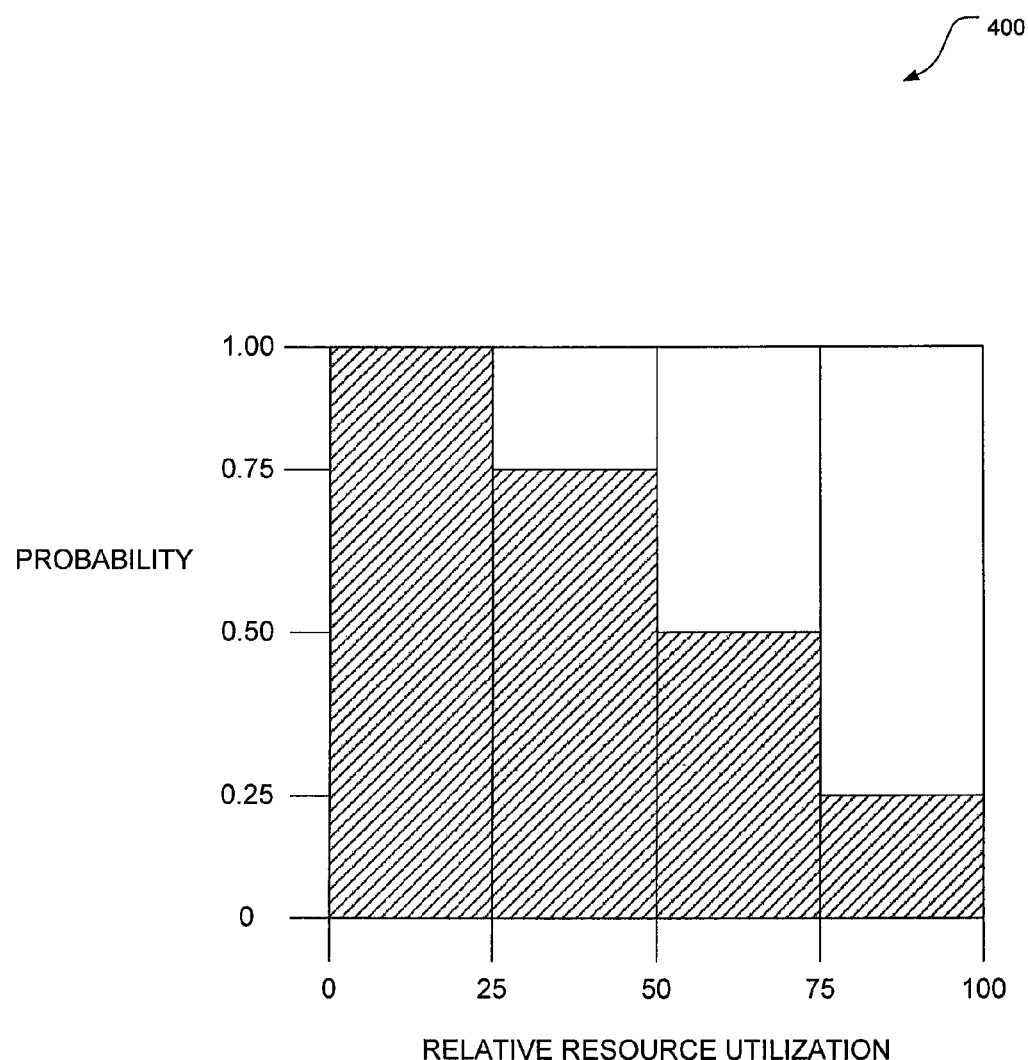
FIG. 4 is a graph of an example of a probability distribution.

FIG. 4 is a graph of an example of a probability distribution. It should be noted that a variety of different probability distributions can be used to distribute connections within a connectional parallelism architecture. For example, the probability distribution, as illustrated in graph 400, can be a step function-based probability distribution where the probability, as defined along the vertical axis of the graph 400, decreases as the determined relative resource utilization increases, as defined along the horizontal axis of the graph 400. In this example, a system having a connectional parallelism architecture includes four connection groups. The step function shown in FIG. 4 can be used as a probability distribution to identify a probability of assigning a connection to a particular connection group.

As defined along the horizontal axis of the graph 400, the relative resource utilization ranges from 0 to 100. The relative resource utilization is divided into four steps, namely 25, 50, 75, and 100, to correspond to the four connection groups in the system. According to the graph 400, when the relative resource utilization increases by ¼, the probability is also decreased by ¼. Graph 400 also reveals that when connections are evenly distributed (relative resource utilization is close to 0), the probability of generating the same connection group is close to 1. As the skew starts to appear in the graph 400, the probability starts falling in ¼ steps towards 0, and connections assigned to this particular connection group may be queued to other connection groups. The relationship can be expressed in the following probability distribution function where for any connection group A and its relative utilization X(A), the probability P of generating A=a is:

$$P(A = a) \equiv Y(A = a) = 100 - \left[\frac{X(A = a) * N}{100}\right] * \frac{100}{N} \qquad 2.0$$

In Equation 2.0, N is the total number of connection groups in the system and Y(A) is P(A) expressed as a percentage. Equation 2.0 expressed above can be applied to both data rate and connection-based resource utilizations. Furthermore, the probability distribution, such as the probability distribution expressed in Equation 2.0, is predefined. A user can define a variety of different probability distributions based on the needs of a network. As an example, a user can analyze historical network traffic and define a probability distribution function that best suits the needs of the network.

Figure 5:
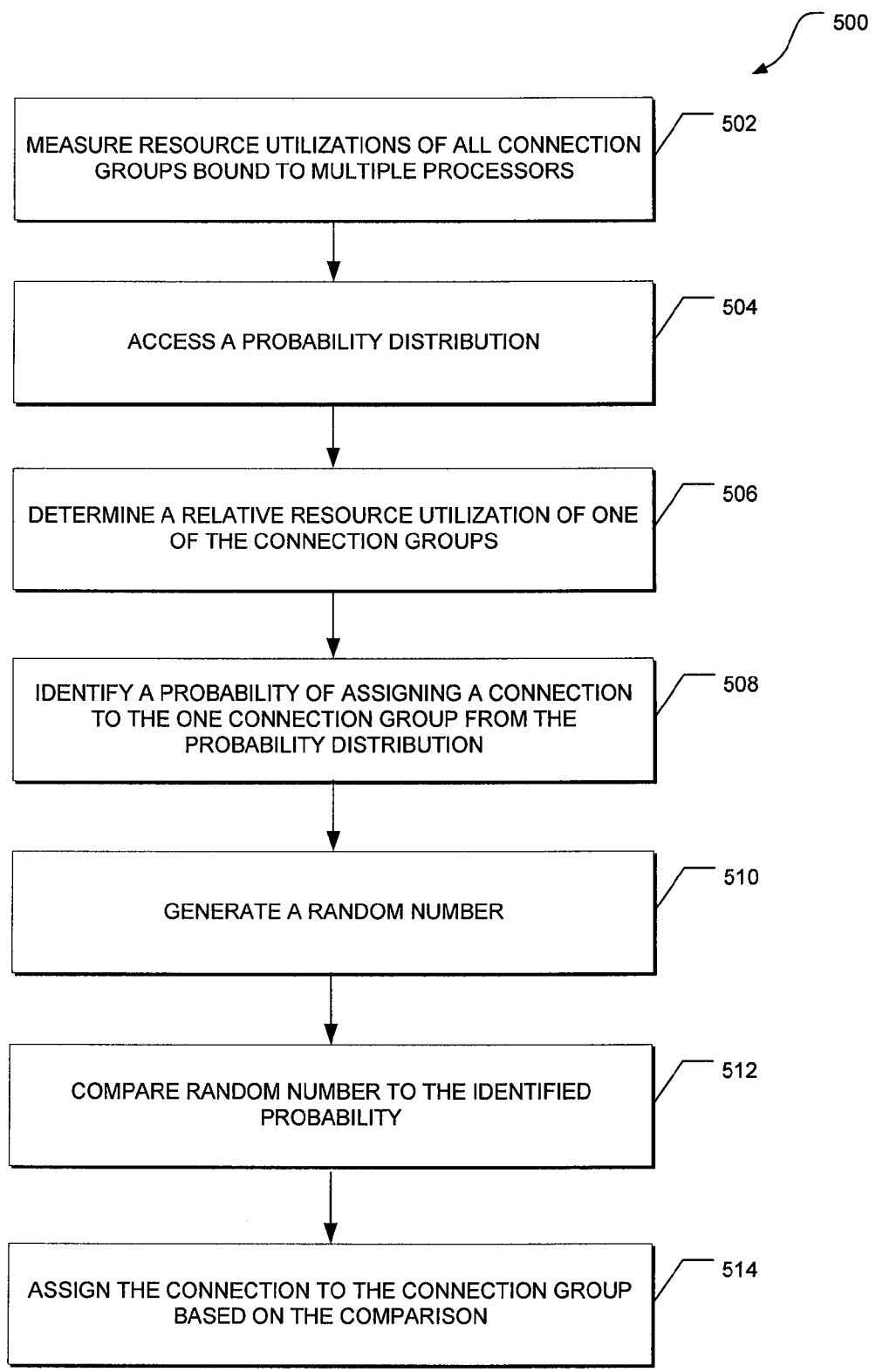
FIG. 5 is a flow diagram of a detailed method, in accordance with an embodiment, of distributing connections within a connectional parallelism architecture.

FIG. 5 is a flow diagram of a detailed method 500, in accordance with an embodiment, of distributing connections within a connectional parallelism architecture. In an exemplary embodiment, the method 500 may be implemented by the connection distribution module 104 as embodied in the network layer 205 depicted in FIG. 2A. In reference to FIG. 5, the connection distribution module at 502 measures the resource utilization of each connection group assigned to a particular processor and, at 504, accesses a probability distribution.

The connection distribution module then selects a particular connection group and determines a relative resource utilization of the selected connection group at 506. In one embodiment, a preference for a particular connection group may be predefined for each connection. In particular, this group preference defines one or more connection groups preferred by the connection over other connection groups. The group preference may, for example, define a connection group 1 for a particular type of TCP connection. As a result, the connection distribution module initially identifies a group preference for the connection, and determines a relative resource utilization of a connection group, as defined in the connection group.

In an alternate embodiment, the group preference may be defined based on previous assignments of the same connection. Here, a presumption can be made that messages associated with the same connection relate to the same process. As a result, it may be more efficient to assign a specific connection group to process all messages that are associated with the same connection. The connection distribution module can store a record of a particular connection group that has been previously assigned to a particular connection. Therefore, if the same connection is requested, the connection distribution module can access this record to identify the previously assigned connection group and then select this connection group at 506 to determine its relative resource utilization.

After the determination of the relative resource utilization for this one connection group, the connection distribution module at 508 identifies, from the probability distribution, a probability of assigning a connection to the selected connection group. Thereafter, the connection distribution module then generates a random number at 510 and compares this random number to the identified probability at 512. The connection distribution module then, at 514, decides whether to assign the connection to the connection group based on this comparison. Particularly, if the connection distribution module determines that the connection is to be assigned to a particular connection group, then the connection distribution module assigns the connection to a group identifier that uniquely identifies this particular connection group.

As an example, the connection distribution module identifies a probability of 0.70 from the probability distribution for assigning a connection to this particular connection group. This 0.70 can mean that there is a 70% chance that the connection will be assigned to this particular connection group. The connection distribution module also generates a random number, say for example, 50, from a range between 0 and 100. This 50 is divided by 100 to define 0.50. Since 0.50 is less than 0.70, then the connection distribution module assigns the connection to this particular connection group. However, if the random number generated is above 70, then the connection distribution module will not assign the connection to this particular connection group.

Particularly, in reference to Equation 2.0 above, a random number between 1 and 100 generated from a uniform distribution when compared against $Y(A)$ can be used to determine whether a connection is assigned to the connection group. For example, if $Y(A)$ is 60 then any random number between 0-59 will result in the connection assigned to the connection group (or staying in the same preferred connection group). That is, for any $Y(A)=y$, a random number q between 1 and 100 is generated. If $q<y$, then $A=a$. Otherwise, $A=b$ where:

$$X(A=b)=\text{MIN}(M(A), \forall A \in [1 \ldots N])  \quad 3.0$$

Equation 3.0 above describes the situation when the random number q falls outside the range (e.g., 60-99). In this example, the connection is routed to an alternate connection group with the lowest utilization.

Figure 6:
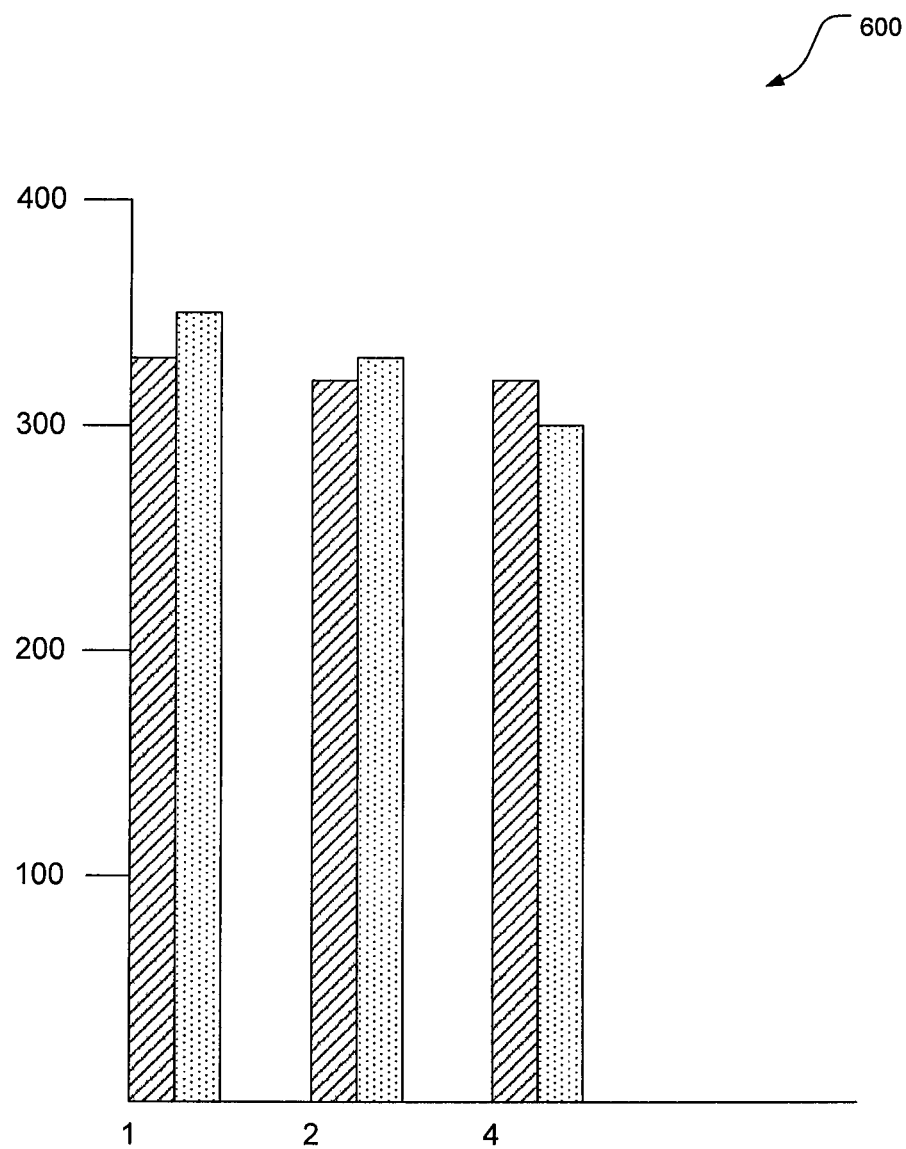
FIG. 6 is a histogram chart depicting the distribution of connections when compared to other existing distribution techniques.

FIG. 6 is a histogram chart 600 depicting the distribution of connections when compared to other existing distribution techniques. In this histogram chart, the horizontal axis defines the connection group distribution while the vertical axis represents the number of connections. The bars having a hatched pattern denote distribution using a probability distribution while the bars having a dotted pattern denote distribution in a round robin manner. The system in this example has four connection groups, and 1,000 connections, 20,000 connections, 100,000 connections are evaluated to simulate low, mid, and high connection count workloads. As illustrated in the histogram chart 600, when compared to round robin, distribution based on a probability distribution, as discussed above, results in a more even distribution of the connections, thereby resulting in more efficient distribution of connections to underutilized processors.

Figure 7:
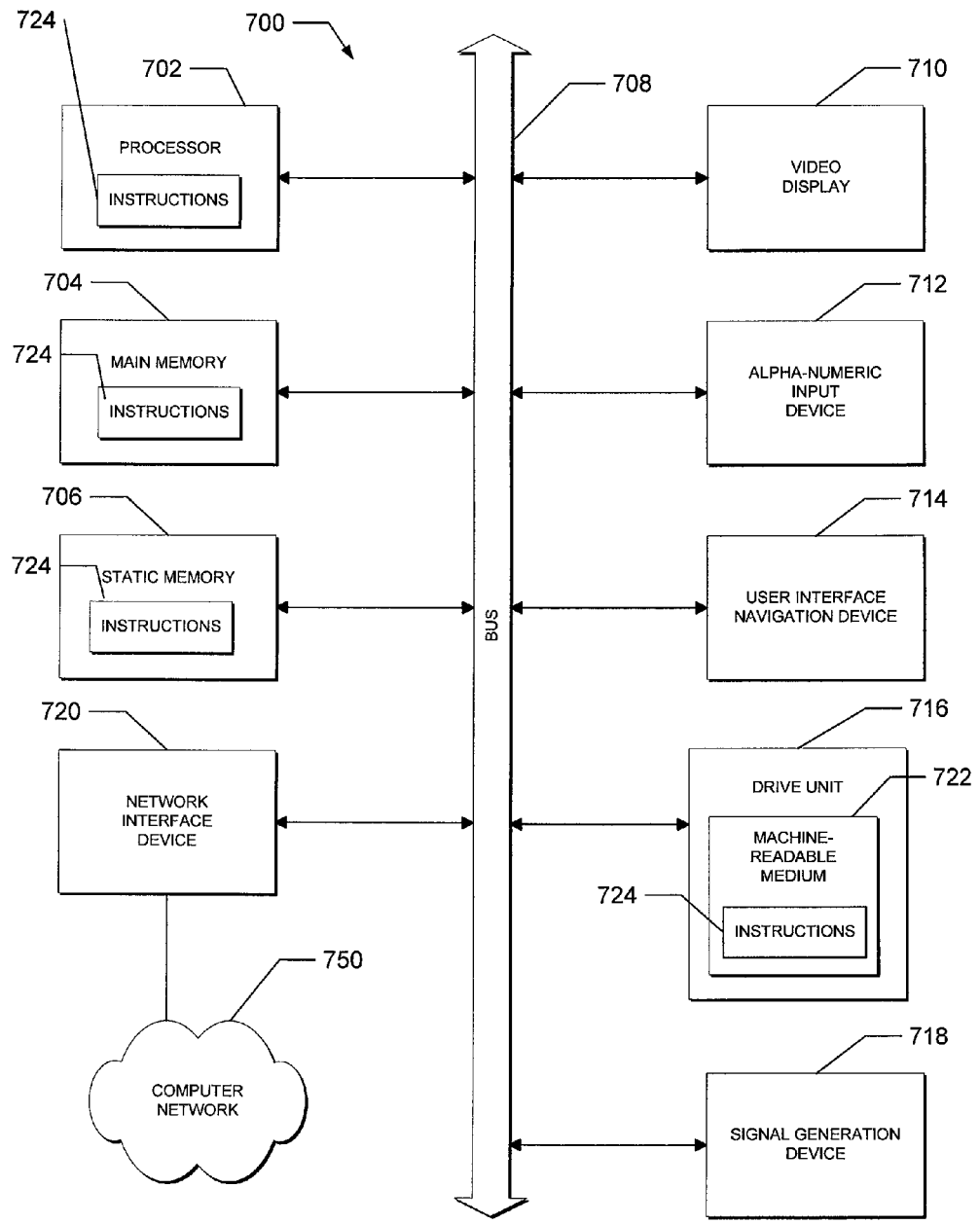
FIG. 7 depicts a hardware block diagram of a machine in the example form of a processing system within which may be executed a set of instructions for causing the machine to perform any one or more of the methodologies discussed herein.

FIG. 7 depicts a hardware block diagram of a machine in the example form of a processing system 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (e.g., a central processing unit (CPU), a graphics processing unit (GPU) or both), a main memory 704 (e.g., random access memory), and static memory 706 (e.g., static random-access memory), which communicate with each other via bus 708. The processing system 700 may further include video display unit 710 (e.g., a plasma display, a liquid crystal display (LCD) or a cathode ray tube (CRT)). The processing system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704 and/or within the processor 702 during execution thereof by processing system 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute software modules (e.g., code embodied on a machine-readable medium or in a transmission signal) and/or hardware modules. A hardware module is a tangible unit capable of performing certain operations and may be configured or arranged in a certain manner. In example embodiments, one or more computer systems (e.g., the processing system 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some example embodiments, the processors 702 may be located in a single location (e.g., within a home environment, an office environment or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for connection distribution may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of distributing connections within a connectional parallelism architecture, the method comprising:
   measuring resource utilizations for each of multiple connection groups, each connection group being assigned to one of multiple processors;
   accessing a probability distribution that maps probabilities with relative resource utilizations, wherein the probabilities decrease as the relative resource utilizations increase;
   determining a relative resource utilization of one of the connection groups based on a resource utilization of the one connection group relative to other resource utilizations of other connection groups;
   identifying, from the probability distribution, a probability of assigning a connection to the one connection group based on the determined relative resource utilization of the one connection group; and
   based on the identified probability, making a determination to assign the connection to the one connection group for execution by one of the multiple processors assigned to the one connection group or to assign the connection to another connection group.

2. The method of claim 1, further comprises identifying, before assignment of the connection, a group preference of the connection, the group preference defining the one connection group preferred by the connection over the other connection groups.

3. The method of claim 2, wherein the group preference is predefined.

4. The method of claim 2, wherein the group preference is defined based on a previous assignment of the same connection.

5. The method of claim 1, wherein each connection group is identified by a group identifier, and wherein the assignment of the connection comprises assigning the connection to a group identifier that identifies the one connection group.

6. The method of claim 1, wherein the probability distribution is predefined, and wherein the probability distribution corresponds to a step function-based distribution in which probabilities decrease as relative resource utilizations increase.

7. The method of claim 1, wherein measuring the resource utilizations comprises measuring a number of connections to each of the multiple connection groups.

8. The method of claim 7, wherein the relative resource utilization is determined based on a ratio of a number of connections owned by the one connection group to a total number of connections.

9. The method of claim 1, wherein measuring the resource utilizations comprises measuring data rates serviced by the connection groups.

10. The method of claim 9, wherein the relative resource utilization is determined based on a ratio of a data rate serviced by the one connection group to a total data rate serviced by the connection groups.

11. The method of claim 1, wherein the connections are Transmission Control Protocol (TCP) connections.

12. A non-transitory, machine-readable medium storing instructions that, when performed by a machine, cause the machine to perform operations comprising:
   measuring resource utilizations for each of multiple connection groups;
   accessing a probability distribution that maps probabilities with relative resource utilizations, wherein the probabilities decrease as the relative resource utilizations increase;

determining a relative resource utilization of a connection group of the multiple connection groups based on a resource utilization of the connection group relative to other resource utilizations of other connection groups;

identifying, from the probability distribution, a probability of assigning a connection to the connection group based on the determined relative resource utilization of the connection group; generating a random number;

comparing the random number to the identified probability; and performing an operation based on the comparison so that (i) when the random number is less than the identified probability, the connection is assigned to the connection group, and (ii) when the random number is greater than or equal to the identified probability, the connection is assigned to another connection group with a lower relative resource utilization.

13. The non-transitory, machine-readable medium of claim 12, wherein the probability distribution is based on connection counts.

14. The non-transitory, machine-readable medium of claim 13, wherein the relative resource utilization is determined based on a ratio of a number of connections owned by the connection group to a total number of the connections.

15. The non-transitory, machine-readable medium of claim 12, wherein the probability distribution is based on data rates.

16. The non-transitory, machine-readable medium of claim 15, wherein the relative resource utilization is determined based on a ratio of a data rate serviced by the connection group to a total data rate serviced by the connection groups.

17. The non-transitory, machine-readable medium of claim 12, wherein the connections are User Datagram Protocol (UDP) connections.

18. A system comprising:

a plurality of processors including at least a first processor and a second processor; and a memory in communication with the first and second processors, the memory being configured to store a connection distribution module having instructions that when executed, cause operations to be performed, the operations comprising:

measuring resource utilizations for each of multiple connection groups, the connection groups including a first and second connection groups assigned to the first and second processors, respectively;

accessing a probability distribution that maps probabilities with relative resource utilizations, wherein the probabilities decrease as the relative resource utilizations increase;

determining a relative resource utilization of the first connection group based on a resource utilization of the first connection group relative to other resource utilizations of other connection groups;

identifying, from the probability distribution, a probability of assigning a connection to the first connection group based on the determined relative resource utilization of the first connection group;

generating a random number; comparing the random number to the identified probability; and performing an operation based on the comparison so that (i) when the random number is less than the identified probability, the connection is assigned to the first connection group for execution by the first processor, and (ii) when the random number is greater than or equal to the identified probability, the connection is assigned to the second connection group for execution by the second processor or another connection group.

19. The system of claim 18, wherein the connection distribution module is embodied in a network layer.

20. The system of claim 18, wherein the first and second processors are embodied in a single processing system.

21. The system of claim 18, wherein the first processor is embodied in a processing system and the second processor is embodied in a different processing system.

* * * * *